United States Patent
Deboy et al.

(10) Patent No.: US 11,728,746 B2
(45) Date of Patent: Aug. 15, 2023

(54) CURRENT SOURCE INVERTER AND METHOD OF OPERATING A CURRENT SOURCE INVERTER

(71) Applicant: Infineon Technologies Austria AG, Villach (AT)

(72) Inventors: Gerald Deboy, Klagenfurt (AT); Johann Kolar, Zurich (CH); Matthias Joachim Kasper, Villach (AT); Dominik Bortis, Zurich (CH); Mattia Guacci, Zurich (CH)

(73) Assignee: Infineon Technologies Austria AG, Villach (AT)

( * ) Notice: Subject to any disclaimer, the term of this patent is extended or adjusted under 35 U.S.C. 154(b) by 291 days.

(21) Appl. No.: 16/848,104

(22) Filed: Apr. 14, 2020

(65) Prior Publication Data

US 2020/0328698 A1 Oct. 15, 2020

(30) Foreign Application Priority Data

Nov. 8, 2019 (EP) .................................. 19208167

(51) Int. Cl.
*H02M 7/5387* (2007.01)
*H02M 7/487* (2007.01)
*H02M 7/48* (2007.01)

(52) U.S. Cl.
CPC ......... *H02M 7/53871* (2013.01); *H02M 7/48* (2013.01); *H02M 7/487* (2013.01)

(58) Field of Classification Search
CPC .... H02M 7/487; H02M 1/007; H02M 1/0087; H02M 1/4291; H02M 1/32; H02M 3/158; Y02B 70/10
See application file for complete search history.

(56) References Cited

U.S. PATENT DOCUMENTS

| | | | | |
|---|---|---|---|---|
| 4,833,584 A | * | 5/1989 | Divan | H02M 7/538 363/37 |
| 5,764,024 A | * | 6/1998 | Wilson | H02P 27/08 318/400.11 |
| 6,075,328 A | * | 6/2000 | Notohara | H02M 5/458 388/811 |
| 6,271,651 B1 | * | 8/2001 | Stratakos | H02M 3/158 323/282 |
| 7,482,777 B2 | * | 1/2009 | Tomigashi | H02P 6/18 318/807 |
| 9,093,932 B2 | * | 7/2015 | Osaki | H02P 6/28 |

(Continued)

FOREIGN PATENT DOCUMENTS

| | | |
|---|---|---|
| CN | 107769559 A | 3/2018 |
| EP | 2299583 A1 | 3/2011 |
| WO | 2018168328 A1 | 9/2018 |

OTHER PUBLICATIONS

Friedli, Thomas, et al., Design and Performance of a 200-kHz All—SiC JFET Current DC-Link Back-to-Back Converter, IEEE Transactions on Industry Applications, vol. 45, No. 5, Sep./Oct. 2009, pp. 1868-1878.

*Primary Examiner* — Yusef A Ahmed
(74) *Attorney, Agent, or Firm* — Murphy, Bilak & Homiller, PLLC (57) ABSTRACT

Disclosed is a current source inverter that includes a combination of normally-on and normally-off switches configured to provide free-wheeling paths for current in case of loss of control signals or gate drive power.

14 Claims, 5 Drawing Sheets

(56) References Cited

U.S. PATENT DOCUMENTS

| | | | |
|---|---|---|---|
| 9,397,580 B1* | 7/2016 | Alexander | H02M 3/1582 |
| 9,520,764 B1* | 12/2016 | Bundschuh | H02M 1/08 |
| 9,678,519 B1* | 6/2017 | Alexander | G05F 1/10 |
| 9,800,167 B2* | 10/2017 | Aeloiza | H02M 5/293 |
| 2004/0008530 A1* | 1/2004 | Kitahata | H02M 7/5387 363/131 |
| 2004/0145338 A1* | 7/2004 | Nakamura | B60L 3/12 318/434 |
| 2004/0165868 A1* | 8/2004 | Sato | H02P 27/14 388/804 |
| 2007/0211501 A1* | 9/2007 | Zargari | H02M 1/44 363/39 |
| 2007/0216469 A1* | 9/2007 | Sakamoto | H03K 17/063 327/519 |
| 2008/0013351 A1* | 1/2008 | Alexander | H02M 5/225 363/123 |
| 2009/0154201 A1* | 6/2009 | Ecrabey | H02M 5/458 363/37 |
| 2009/0285005 A1* | 11/2009 | Gopfrich | H02M 7/539 363/132 |
| 2010/0127652 A1* | 5/2010 | Morita | H01L 29/7787 318/400.27 |
| 2010/0134053 A1* | 6/2010 | Yamada | H02P 27/08 318/162 |
| 2010/0141188 A1* | 6/2010 | Kakebayashi | H02P 3/18 318/400.3 |
| 2010/0165682 A1* | 7/2010 | Sakakibara | H02P 27/08 363/126 |
| 2010/0194330 A1* | 8/2010 | Hayashi | H02P 27/08 318/799 |
| 2010/0315024 A1* | 12/2010 | Najima | H02M 7/53871 318/139 |
| 2011/0025246 A1* | 2/2011 | Sakakibara | H02M 1/4216 318/400.42 |
| 2011/0090717 A1* | 4/2011 | Lee | H02M 3/33584 363/21.02 |
| 2011/0103117 A1* | 5/2011 | Yoneda | H02M 7/48 363/132 |
| 2011/0115417 A1* | 5/2011 | Shimada | H02M 7/493 318/139 |
| 2011/0134663 A1* | 6/2011 | Sakakibara | H02M 7/2173 363/37 |
| 2011/0157948 A1* | 6/2011 | Sato | H02M 7/5387 363/132 |
| 2011/0248663 A1* | 10/2011 | Yamakawa | B60L 50/13 318/805 |
| 2011/0292697 A1* | 12/2011 | Alexander | H02M 7/4807 363/37 |
| 2011/0304212 A1* | 12/2011 | Choi | H02M 7/48 307/66 |
| 2012/0001581 A1* | 1/2012 | Sumita | H02P 21/0003 318/490 |
| 2012/0014151 A1* | 1/2012 | Alexander | H02M 7/4807 363/123 |
| 2012/0018777 A1* | 1/2012 | Takizawa | H02M 1/32 257/140 |
| 2012/0081058 A1* | 4/2012 | Bortolus | H02K 11/001 318/494 |
| 2012/0086350 A1* | 4/2012 | Lin | H05B 41/2828 315/200 R |
| 2012/0087167 A1* | 4/2012 | Kuzumaki | H02M 7/5388 363/131 |
| 2012/0112671 A1* | 5/2012 | Yamaguchi | H02P 23/0077 318/400.3 |
| 2012/0146567 A1* | 6/2012 | Iwaji | H02P 29/02 318/504 |
| 2013/0009624 A1* | 1/2013 | Tagome | B60L 3/00 323/350 |
| 2013/0039100 A1* | 2/2013 | Kazama | H02M 7/497 363/41 |
| 2013/0063994 A1* | 3/2013 | Alexander | H02M 5/225 363/123 |
| 2013/0134918 A1* | 5/2013 | Richards | H02P 6/28 310/156.01 |
| 2014/0015592 A1 | 1/2014 | Weis | |
| 2015/0029769 A1* | 1/2015 | Blanchard | H01L 29/0619 363/123 |
| 2015/0098258 A1* | 4/2015 | Park | H02H 7/1216 363/37 |
| 2015/0249384 A1* | 9/2015 | Liu | H02M 7/537 363/131 |
| 2015/0249394 A1* | 9/2015 | Liu | H02M 3/3376 363/21.02 |
| 2015/0295514 A1* | 10/2015 | Yamagami | B60L 58/12 363/98 |
| 2015/0311851 A1* | 10/2015 | Kondo | H02P 6/14 318/400.27 |
| 2015/0381047 A1* | 12/2015 | Chang | H02M 3/158 323/311 |
| 2016/0079892 A1* | 3/2016 | Arafat | H02P 29/50 318/400.28 |
| 2016/0141982 A1* | 5/2016 | Yim | H02P 6/16 318/400.17 |
| 2016/0380429 A1* | 12/2016 | Krstic | H02H 7/125 307/77 |
| 2017/0207634 A1* | 7/2017 | Katano | B60L 15/007 |
| 2017/0229972 A1* | 8/2017 | Cerqueira Pinto Bezerra Varajão | H02M 7/217 |
| 2018/0212510 A1* | 7/2018 | Takahashi | H02M 1/083 |
| 2018/0219506 A1* | 8/2018 | Mori | B62D 5/046 |
| 2018/0241302 A1* | 8/2018 | Matsuhisa | H02M 7/53871 |
| 2019/0149031 A1* | 5/2019 | Kitamoto | B62D 5/0487 363/131 |
| 2019/0305710 A1* | 10/2019 | Tanahashi | H02M 7/5387 |
| 2019/0319531 A1* | 10/2019 | März | H02M 1/38 |
| 2019/0319546 A1* | 10/2019 | Giuntini | H02M 1/4216 |
| 2020/0021226 A1* | 1/2020 | Welchko | H02P 27/085 |
| 2020/0244177 A1* | 7/2020 | Ono | H02M 5/4585 |
| 2021/0091663 A1* | 3/2021 | Perez | H02M 7/5387 |

* cited by examiner

CURRENT SOURCE INVERTER AND METHOD OF OPERATING A CURRENT SOURCE INVERTER

TECHNICAL FIELD

This disclosure relates in general to a power converter an a power conversion method.

BACKGROUND

Power converters are widely used in various kinds of applications. Basically, a power converter is configured to convert power received from a power source, such as a battery or a power grid, into power suitable to be used by a load. In a motor drive applications, for example, a power converter may receive power from a DC (Direct Current) power source and drive a motor based on the power received from the power source. A power converter configured to drive a motor may be implemented as a voltage source inverter. A voltage source inverter includes a bridge circuit with electronic switches and may be configured to generate at least one output voltage with at least two different voltage levels by suitably switching on and off the switches in the bridge circuit. The at least two voltage levels may include an upper level $+V_{dc}/2$ and a lower level $-V_{dc}/2$ wherein $V_{dc}$ represents the voltage level of the DC voltage provided by the power source. By suitably varying the output voltage between the two voltage levels a rotational speed of the motor can be adjusted. Generating the output voltage may include alternatingly switching between the upper level for a first time period and the lower level for a second time period, wherein by suitably varying a ratio between the first time period and the second time period a polarity and a voltage level of the output voltage on average can be adjusted. For various reasons, however, a. switching frequency in a voltage source inverter should not exceed several 10 kHz.

Increasing the switching frequency, however, would be desirable, as this would make it possible to reduce the size and cost of filter components of an output filter in the power converter. In a voltage source inverter such output filter may include one or more RC elements, wherein each RC element may include a resistor and a capacitor.

SUMMARY

One example relates to a power converter implemented as a current source inverter. The current source inverter uses a combination of normally-on and normally-off switches to provide free-wheeling paths for the current in case of loss of control signals or gate drive power.

That is, the invention in particular relates to providing one or more free-wheeling paths in a current source inverter in case of loss of control signals or gate drive power by using a combination of normally-on and normally-off switches. In addition to or as an alternative to using a combination of normally-on and normally-off switches a clamping network may be used to provide one or more free-wheeling paths in the current source inverter.

Those skilled in the art will recognize additional features and advantages upon reading the following detailed description, and upon viewing the accompanying drawings.

BRIEF DESCRIPTION OF THE FIGURES

Examples are explained below with reference to the drawings. The drawings serve to illustrate certain principles, so that only aspects necessary for understanding these principles are illustrated. The drawings are not to scale. In the drawings the same reference characters denote like features.

DETAILED DESCRIPTION

In the following detailed description, reference is made to the accompanying drawings. The drawings form a part of the description and for the purpose of illustration show examples of how the invention may be used and implemented. It is to be understood that the features of the various embodiments described herein may be combined with each other, unless specifically noted otherwise.

Figure 1:
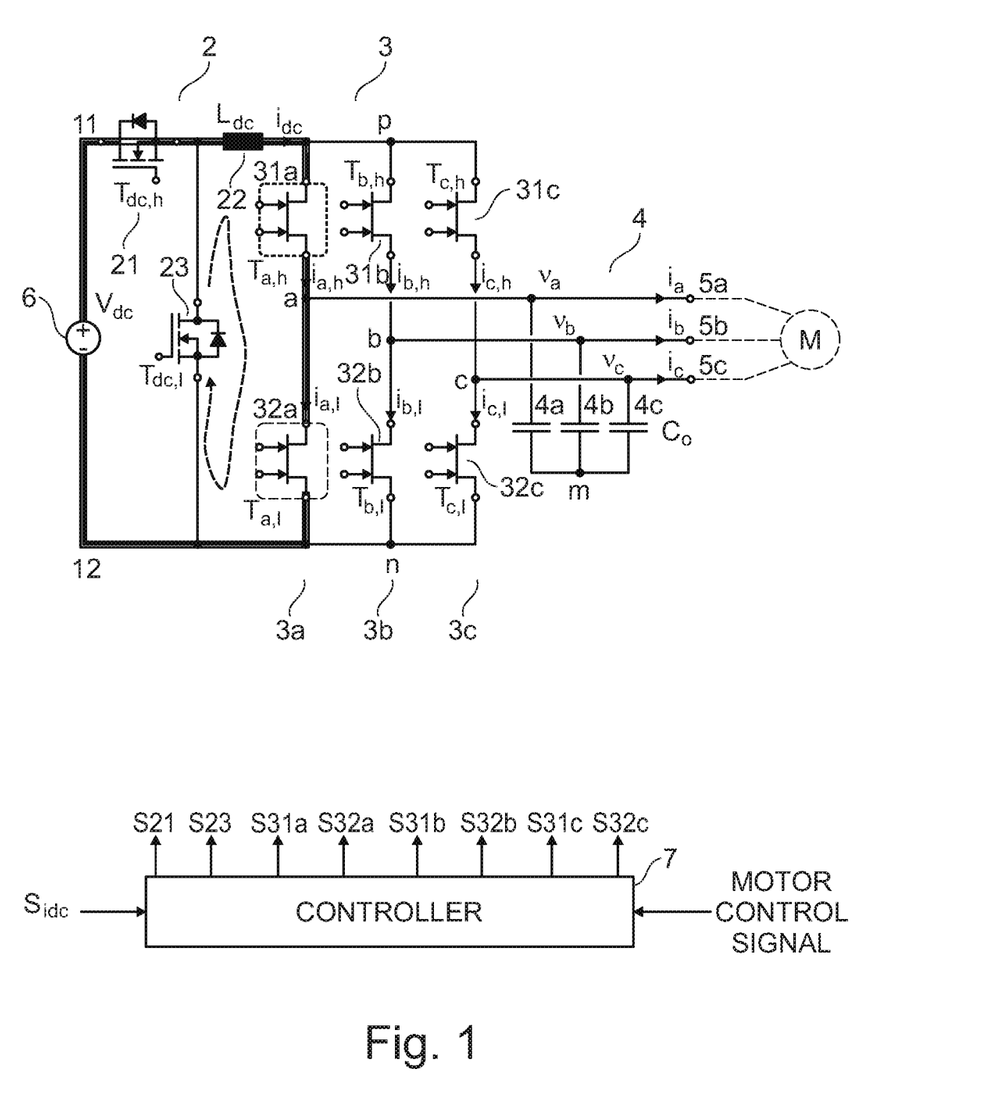
FIG. 1 illustrates one example of a power converter in a motor drive application, wherein the power converter includes a current source architecture and a combination of normally-on and normally-off switches.

One aspect of the invention is shown in FIG. 1 which illustrates a three-phase motor drive using a current source instead of a voltage source converter. The current source may be configured as a buck converter. The motor control itself consists of a classic B6 bridge.

More specifically, FIG. 1 shows one example of a power converter which includes a current source 2 and an inverter 3 connected to the power source 2, wherein this type of power converter may be referred to as current source inverter.

The current source 2 is connected to an input 11, 12 and is configured to receive power from a power source 6 via the input 11, 12. According to one example, the power source is a DC voltage source that is configured to provide a DC voltage $V_{dc}$ as an input voltage of the current source 2. The current source 2 is configured to provide a source current $i_{dc}$ to intermediate nodes p, n of the power converter. The inverter 3 is connected to the intermediate nodes p, n and is configured to provide output voltages $v_a$, $v_b$, $v_c$ and output currents $i_a$, $i_b$, $i_c$ at respective outputs 5a, 5b, 5c of the inverter 3 based on the source current received from the current source 2. The output 5a, 5b, 5c is configured to have a motor M (illustrated in dashed lines) connected thereto.

Basically, the inverter 3 includes at least two half bridges, wherein the number of half bridges is dependent on the type of motor that is to be driven. In the example shown in FIG. 1, the power converter is configured to provide three output currents $i_a$, $i_b$, $i_c$ in order to drive a 3-phase motor. Each half bridge is configured to provide one of the output currents $i_a$, $i_b$, $i_c$ so that in this example the inverter 3 includes three half bridges 3a, 3b, 3c.

Each of these half bridges 3a, 3b, 3c is connected between the intermediate nodes p, n and includes a respective tap a, b, c (which may also be referred to as Outputs of the half-bridges). Each tap a, b, c is connected to a respective one of the outputs 5a, 5b, 5c, More specifically, the tap a of a first half bridge 3a is connected to a first output node 5a, the tap b of a second half bridge 3b is connected to a second output node 5b, and the tap c of a third half bridge 3c is connected to a third output node 3c. Further, each of the half bridges 3a, 3b, 3c includes a high-side switch 31a, 31b, 31c and a low-side switch 32a, 32b, 32c. The high-side switch 31a, 31b, 31c and the low-side switch 32a, 32b, 32c of each half bridge 3a, 3b, 3c are connected in series between the intermediate nodes p, n. The tap a, b, c of each half bridge 3a, 3b, 3c is formed by a circuit node at which the respective high-side switch 31a, 31b, 31c and the respective low-side switch 32a, 32b, 32c are connected.

The high-side switches 31a, 31b, 31c and the low-side switches 32a, 32b. 32c of the half bridges 3a, 3b, 3c may be driven dependent on respective control signals S31a, S31b, S31c, S32a, S32b, S32c provided by a controller 7. Generating these control signals by the controller 7 is explained in further detail below. The control signals S31a, S31b, S31c, S32a, S32b, S32c provided by the controller may be suitable to drive the high-side switches. Alternatively, drivers (not illustrated in FIG. 1) receive the control signals S31a, S31b, S31c, S32a, S32b, S32c and are configured to drive the high-side switches 31a, 31b, 31c and the low-side switches 32a, 32b, 32c based on the control signals S31a, S31b, S31c, S32a, S32b, S32c.

In the following, when no differentiation between the half bridges 3a, 3b, 3c is required reference number 3 denotes an arbitrary one or the plurality of the half bridges 3a, 3b, 3c. Equivalently, reference number 31 denotes an arbitrary one or the plurality of the high-side switches 31a, 31b, 31c, reference number 32 denotes an arbitrary one or the plurality of the low-side switches 32a, 32b, 32c, reference sign S31 denotes an arbitrary one or the plurality of the control signals S31a, S31b, S31c of the high-side switches 31a, 31b, 31c, and reference sign S32 denotes an arbitrary one or the plurality of the control signals S32a, S32b, S32c of the low-side switches 32a, 32b, 32c.

According to one example, the high-side switch 31 and the low-side switch 32 of at least one of the half bridges 3 are implemented as normally-on switches. A "normally-on switch" is an electronic switch that is in on-state (an electrically conducting state) when a drive signal received at a drive input is zero. "A drive signal" includes at least one of a drive voltage and a drive current. A drive signal of zero may occur intentionally when it is desired to switch on the respective switch by the controller 7. A drive signal of zero, however, may also occur when a power supply of the controller 7 or the optional drivers (not shown) fails, or when a signal path between the controller 7 and a respective one of the switches 31, 32 is interrupted.

Implementing the high-side switch 31 and the low-side switch 32 of at least one of the half bridges 3 as normally-on switches provides a current path in the inverter 3 for the source current $i_{dc}$ provided by the current source 2 when a failure occurs. If, for example, the switches 31a, 32a of the first half bridge 3a are implemented as normally-on switches the current $i_{dc}$ provided by the current source 2 can flow via the switches 31a, 32a of the first half bridge 3a in the inverter 3 back to the current source 2. Referring to FIG. 1 and as explained in detail herein further below, the current source 2 may include an inductor 22 through which the source current $i_{dc}$ flows and a freewheeling element 23. The freewheeling element 23 in the current source 2 and the normally-on switches in the inverter 3 (switches 31a, 31b, for example) form a freewheeling current path (that is illustrated in dashed lines in FIG. 1), wherein this freewheeling path allows the current through the inductor 22 to continue to flow when a failure occurs. According to one example, the switches of each of the half bridges 3a, 3b, 3c are implemented as normally-on switches. According to another example, only one of the half bridges is implemented with normally-on switches.

According to one example, the normally-on switches are bidirectionally blocking GaN HEMTs (High Electron Mobility Transistors). A bidirectionally blocking GaN HEMT may include a series circuit of two unidirectionally blocking GaN HEMTs, wherein the two series connected HEMTs are driven by the same drive signal so that both HEMTs switch on or switch off at the same time. Bidirectionally blocking GaN HEMTs are commonly known, so that no further explanations are required in this regard.

In contrast to classic B6 bridges using IGBTs, the topology according to FIG. 1 uses bidirectional switches to create a bridge allowing recuperation of the rotating energy of the machine (the motor M) or its load respectively with only two switches between the current source 2 and the motor M. In conventional topologies without bidirectional power flow capability a combination of a switch and an anti-serial diode is needed. The current can be modulated in the form of a three-phase rectified sinusoidal waveform. The amplitude can be regulated in such a way that the current exactly matches the power required by the motor. With such a regulation scheme a very simple and effective modulation scheme can be used. If the current is too high part of the current can be bypassed from the motor M by short-circuiting one bridge leg, that is, by switching on the high-side switch 31 and the low-side switch 32 of one half-bridge.

Implementing the switches 31, 32 of at least one of the half-bridges 3 as normally-on switches provides one freewheeling path for the current $i_{dc}$ provided by the current source 2 without short circuiting an output filter (that is explained herein further below) nor input 11, 12. Using normally-on switches, in particular in combination with normally-off switches, features a high degree of fail-safe operation and will not lead to destruction of switches in case of e.g. loss of gate drive power or loss of control signals S31, S32.

A combination of normally-on and normally-off switches may be used in a currents source inverter that is used in a motor drive. This, however, is only an example. A current source inverter of this type may be used in other cases as well.

Just for the purpose of illustration, the inverter 3 shown in FIG. 1 is a 3-phase inverter, which is an inverter configured to provide three output voltages $v_a$, $v_b$, $v_c$, and three output currents $i_a$, $i_b$, $i_c$. Consequently, the motor M is a 3-phase motor. This, however, is only an example. The inverter could also be implemented as a 2-phase inverter. An example of a 2-phase inverter is explained herein further below.

Referring to FIG. 1, an output filter 4 may be connected between the Output nodes 5a, 5b, 5c and a ground node m. According to one example, this filter 4 is a capacitive filter that includes a plurality of capacitors 4a, 4b, 4c, wherein each of these capacitors 4a, 4b, 4c is connected between the ground node m and a respective one of the output nodes 5a, 5b, 5c, wherein the ground node in may be different from each of the input nodes 11, 12. According to one example, the high-side switch 31 and the low-side switch 32 of only one of the half-bridges 3 are implemented as normally-on switches while the high-side switch 31 and the low-side switch 32 of the remainder of the half-bridges 3 are normally-off switches. In this example, when a failure occurs, a short circuit between the filter capacitances 4a, 4b, 4c of the output filter 4 can be prevented.

One advantage of a current source topology in comparison to the well-known voltage source converter is that the motor M is fed by a continuous voltage with currents $i_a$, $i_b$, $i_c$ being controlled and re-directed to the three windings of the motor M. The current waveforms, ideally sinusoidal with varying frequency, can be pre-shaped by the current source 2 in such a way that the resulting waveform represents a rectified three-phase sinusoidal signal. This type of modulation scheme is disclosed in Swiss patent application no. 00127/19 (applicant: ETH Zurich, applicant's reference no. P4688 CH). This modulation scheme allows to refrain from PWM switching at intervals of the most positive and most negative phase currents and hence increases efficiency while lowering control complexity simultaneously. This is explained in the following.

Referring to the above, the inverter 3 is configured to generate alternating output currents $i_a$, $i_b$, $i_c$ based on the source current $i_{dc}$. More specifically, the inverter 3 is configured to generate three sinusoidal output currents $i_a$, $i_b$, $i_c$ each having a predefined frequency and amplitude, wherein a phase shift between these output currents $i_a$, $i_b$, $i_c$ is essentially 120°.

Figure 2:
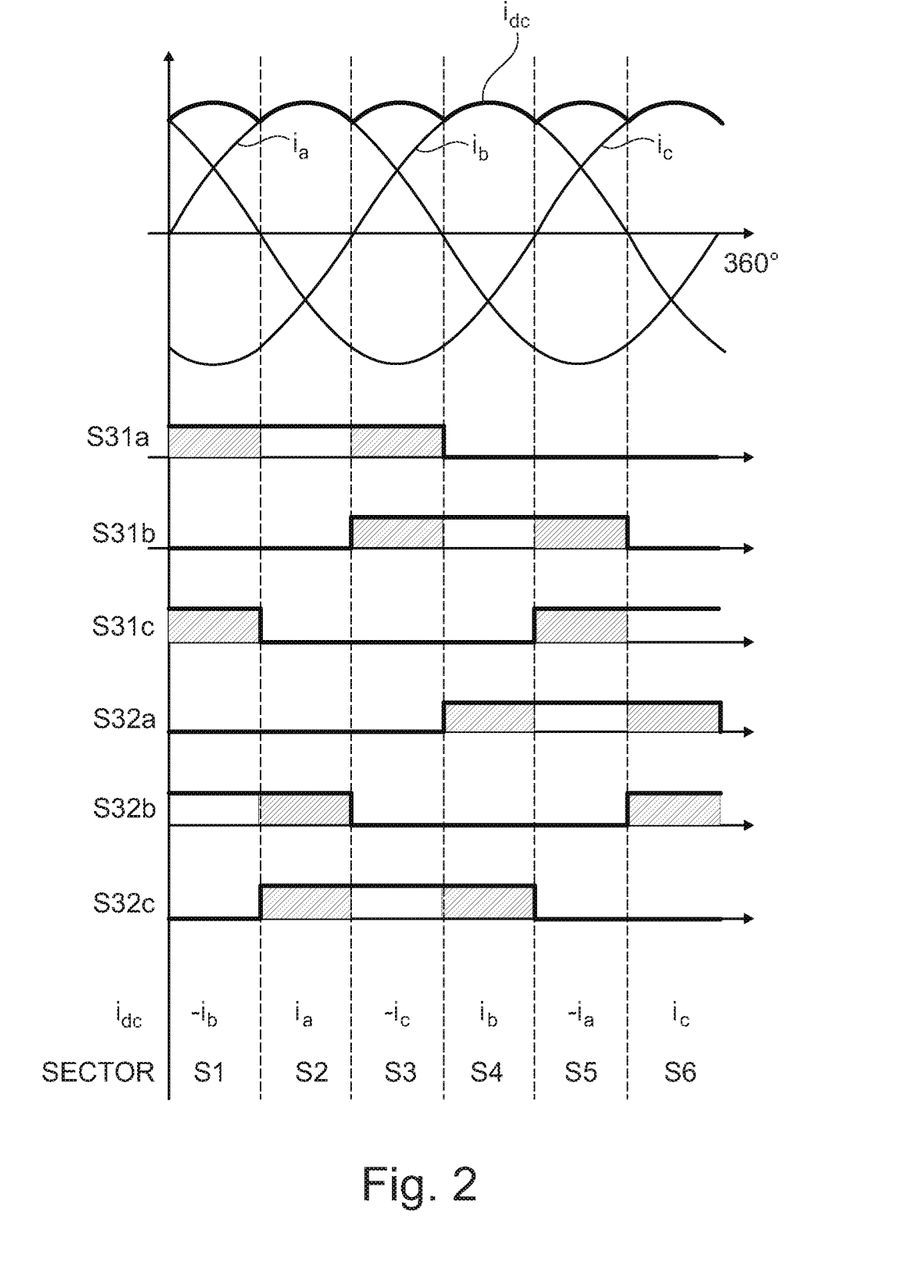
FIG. 2 illustrates one example of a current modulation scheme of the power converter shown in FIG. 1.

FIG. 2 schematically illustrates signal waveforms of these output currents $i_a$, $i_b$, $i_c$ over one period, that is over 360° (=2π). Referring to the above, there is a phase shift of 120° between the individual output currents $i_a$, $i_b$, $i_c$. Further, one period of the three output currents $i_a$, $i_b$, $i_c$ can be subdivided into six sectors S1-S6 each covering 60° (=π/3) of one period. In each of these sectors, the current direction of the output currents $i_a$, $i_b$, $i_c$ does not change. This is explained in the following.

For explanation purposes the current $i_c$ at the first output node 5a is referred to as first output current, the current $i_b$ at the second output node Sb is referred to as second output current, and the current $i_c$ at the third output node 5c is referred to as third output current. Each of these currents $i_a$, $i_b$, $i_c$ can have one of two different current directions, a first direction and an opposite second direction. For the purpose of explanation, it is assumed that the first direction equals the direction illustrated by the arrows in FIG. 1 and that the second direction is opposite to the direction indicated by the arrows in FIG. 1. An output current having the first direction is referred to as "positive output current" in the following, and an output current having the second direction is referred to as "negative output current" in the following.

Referring to FIG. 2, in each of the six sectors, two of the output currents have the same direction. In a first sector S1, for example, the first output current $i_a$ and the third output current $i_c$ are positive and the second output current $i_b$ is negative. Between the first sector S1 and the second sector S2, the direction of the third output current $i_c$ changes so that in the second sector S2, for example, the first output current $i_a$ is positive and the second output current $i_b$ and the third output current $i_c$ are negative. Further, in each of these sectors, an absolute value of the sum of the currents that have the same direction equals the absolute value of the current that has the opposite direction. Thus, in the third sector S3, for example, in which the first current $i_a$ and the second current $i_b$ are positive and the third current $i_c$ is negative.

$$|i_a+i_b|=|i_c| \qquad (1).$$

In the following, in each of the sectors S1-S6, the output current the absolute value of which is given by the absolute value of the sum of the two other output currents is referred to as maximum output current. Equivalently, the one of the outputs that receives the maximum output current is referred to as maximum current output. In the fourth sector S4, for example, the second output current $i_b$ is the maximum output current and the second output 5b is the maximum current output; in the fifth sector S5, for example, the negative first output current $i_a$ is the maximum output current and the first output 5a is the maximum current output.

According to one example, the current source 2 is configured to generate the source current $i_{dc}$ such that the source current in each of the six different sectors S1-S6 equals the absolute value of the respective maximum output current.

Referring to FIG. 1, the current source 2 and the inverter 3 may be controlled by a controller 7. This controller 7 may receive a motor control signal, wherein the motor control signal represents desired signal waveforms of the three output currents $i_a$, $i_b$, $i_c$. Thus, the motor control signal represents the frequency and the amplitude of the three output currents $i_a$, $i_b$, $i_c$. Based on the motor control signal, the controller 7 is configured to control the current source 2 such that the source current $i_{dc}$ is in accordance with the desired output currents $i_a$, $i_b$, $i_c$ represented by the motor control signal.

Referring to FIG. 1, the current source 2 may be implemented with a buck converter topology. In this case, the current source 2 includes a series circuit with an electronic switch 21 and an inductor 22 connected between one of the input nodes 11, 12 and one of the intermediate nodes p, n. Further, the current source 2 includes a freewheeling element 23 that is connected between the other one of the intermediate circuit nodes p, n and a circuit node located between the electronic switch 21 and the inductor 22. Referring to FIG. 1, the electronic switch 21 may be implemented as a MOSFET, in particular an n-type enhancement MOSFET. This, however, is only an example. Any other type of electronic switch may be used as well. The electronic switch 21 and the freewheeling element 23 form a half-bridge connected to the input 11, 12.

In the current source 2 according to FIG. 1, the electronic switch 21 repeatedly switches on in order to connect the inductor 22 to the voltage source 6, wherein in those time periods in which the electronic switch 21 is switched off the freewheeling element 23 takes over the current $i_{dc}$ through the inductor 22. The freewheeling element 23 may be implemented as an active freewheeling element (which may also be referred to as synchronous rectifier). In the example shown in FIG. 1, the freewheeling element 23 is implemented as a MOSFET, in particular an n-type enhancement MOSFET. This MOSFET is connected between the intermediate circuit node n and the inductor 22 such that an integrated body diode of the MOSFET 23 conducts the inductor current $i_{dc}$ when the MOSFET 23 is switched off.

Referring to the above, the controller 7 is configured to regulate the source current $i_{dc}$ (which equals the current through the inductor 22) in such a way that the source current $i_{dc}$ is in accordance with a current as defined by the motor control signal. For controlling the source current $i_{dc}$ the controller 7 receives a source current signal S1 that represents the source current $i_{dc}$. This current signal $S_{idc}$ may be provided by a current sensor (not shown) that is configured to sense the source current $i_{dc}$ and provide the current signal $S_{idc}$ such that it represents the source current $i_{dc}$. According to one example, the current signal $S_{idc}$ is proportional to the source current $i_{dc}$. A current sensor of this type is commonly known, so that no further explanation is required in this regard.

The current signal $S_{idc}$ represents the actual value of the source current $i_{dc}$ and the motor control signal represents a desired value of the source current $i_{dc}$. Based on these signals, the controller 7 using control signal S21 operates the electronic switch 21 in a PWM fashion such that the source current $i_{dc}$ is essentially in accordance with the current defined by the motor control signal. Operating the electronic switch 21 in the PWM fashion includes switching on the electronic switch 21 for an on-period and switching off the electronic switch for an off-period in each of a plurality of successive drive cycles. These drive cycles may have the same duration (so that the electronic switch 21 is switched on at a fixed frequency). However, a duty cycle of the PWM operation of the electronic switch 21 is varied by the controller 7 in order to regulate the source current $i_{dc}$. The freewheeling element 23, using control signal S23, is operated in a complementary fashion so that each time the electronic switch 21 is in an on-state the freewheeling element 23 is in an off-state, and vice versa. Operating a buck converter of the type shown in FIG. 1 as a current source is basically known, so that no further explanation is required in this regard.

The inverter 3 is configured to generate the output currents $i_a$, $i_b$, $i_c$ based on the source current $i_{dc}$ provided by the current source 2. This is explained in the following with reference to FIG. 2. It should be noted that FIG. 2 schematically illustrates the individual currents and signals over one period of the sinusoidal output currents $i_a$, $i_b$, $i_c$. In the time domain, the frequency and the amplitude of these output currents $i_a$, $i_b$, $i_c$ may vary as governed by the motor control signal.

FIG. 2 schematically illustrates the source current $i_{dc}$, the output currents $i_a$, $i_b$, $i_c$ and the control signals S31a, S31b, S31c, S32a, S32b, S32c generated by the controller 7 and received by the high-side switches 31a, 31b, 31c and the low-side switches 32a, 32b, 32c. Each of the control signals S31, S32 may have two different signal levels, an on-level that is configured to switch on the respective switch 31, 32 and an off-level that is configured to switch off the respective switch 31, 32. It should be noted that FIG. 2 only serves to illustrate whether it is desired to switch on or switch off a respective switch and does not necessarily illustrate the physical signal levels of the control signals S31, S32. Just for the purpose of illustration, in the example shown in FIG. 2, a higher one of the two signal levels represents an on-level and a lower one of the two signal levels represents an off-level. Further, in the example shown in FIG. 2, hatched sections of the drive signals S31, S32 represent those sectors in which the respective switch is operated in a PWM fashion. (The duration of one drive cycle in the PWM mode is significantly shorter than the duration of each of the six sectors S1-S6, so that in the PWM mode the respective switch is switched on and off many times.)

In the example illustrated in FIG. 2, the source current id, is generated such that it equals the absolute value of the maximum current in each of the six different sectors S1-S6. In this case, the one of the half bridges 3 that has its tap connected to the maximum output has one of its high-side switch 31 and its low-side switch 32 switched on throughout the respective sector. In the first sector S1, for example, the second output current $i_b$ is the maximum output current, wherein this current is a negative current in this sector. In this case, the low-side switch 32b of the second half bridge 2b is switched on throughout the first sector S1. The first output current $i_a$ and the third output current $i_c$ are positive in the first sector so that the high-side switches 31a, 31c of the first and third half bridge 2a, 2c are operated in a PWM fashion throughout the first sector. A duty cycle of an operation of these high-side switches 31a, 31c varies throughout the first sector 1 in order to regulate these currents $i_a$, $i_c$.

Referring to FIG. 2, in each of the sectors S1-S6 a switch in two of the half-bridges 3 is operated in a PWM fashion (while the other switch in these two half-bridges is switched off). Thus, the current at the tap of these two half-bridges is a PWM current, wherein the capacitive output filter 4 filters the PWM currents such that continuous output currents $i_a$, $i_b$, $i_c$ are obtained.

Alternatively, the current can be modulated in classic PWM mode which is commonly known. This may include that the current source 2 provides a source current $i_{dc}$ which is essentially constant over one period of the output currents $i_a$, $i_b$, $i_c$ and has an absolute value that equals a maximum of the absolute value of the maximum output current in each of the six sectors S1-S6. That is, the source current may have a constant current level equal to the maxima of the source current irk illustrated in FIG. 2, or higher. In this case, the one of the half-bridges that provides the maximum output current in each sector does not have one of the high-side switch 31 and the low-side 32 switched on throughout the respective one of the sectors S1-S6, but operates in a PWM mode such that alternatingly an output current is provided at the respective tap a, b, c and the respective tap a, b, c is bypassed.

In the first sector, for example, the second output current $i_b$ is the maximum output current and is negative. In order to generate this second output current $i_b$ from a constant source current $i_{dc}$ alternatingly, in the first half-bridge 3a, the low-side switch 32a is switched (output current mode) on and both the high-side switch 31a and the low-side switch 32a are switched on (bypass mode). When the low-side switch 32a is switched on the current from the tap "a" to the first output 5a essentially equals the source current irk, and when both the high-side switch 31a and the low-side switch 32a are switched on the first half-bridge 3a is in a bypass mode so that the current from the first tap "a" to the first output 5a is essentially zero. By suitably adjusting a ratio between the time period in which the first half-bridge 3a is in the output current mode and the time period in which the first half-bridge 3a is in the bypass mode the average output current from the first tap "a" to the first output 5a can be adjusted such that the second output current $i_b$ has the desired current waveform.

Another advantage of the converter structure shown in FIG. 1 is that feeding currents allows extremely fast switching with all bridge switches 31, 32 without the classic 5V/ns limitations otherwise being present in voltages source inverter drives (this limitation is created both by bearing current issues and interwinding isolation failures). Fast switching and high frequency operation allows a reduction of the filter components and unlocks the true potential of GaN HEMTs for motor drives.

Referring to FIG. 1 we assume loss of gate drive power as an abnormal case. FIG. 1 shows a case with the high side (control switch) 21 of the buck converter 2 being turned on and current free-wheeling through leg a. In case of loss of gate drive power the current can free-wheel through the first half-bridge 3a (bridge leg "a") if these switches 31a, 32a are normally-on devices. The current loop is closed through the body diode of the freewheeling element 23.

In case of recuperation of energy, the current would flow in reverse direction through the inductor 22. In this case currents would free-wheel through bridge leg a and the body diode of the electronic switch 21 and the voltage source 6.

In both cases providing one of the half-bridges 3 (one bridge leg) with normally-on switches and the other two legs with normally-off switches creates a free-wheeling path both in power delivery operation as well as in power recuperation operation without short-circuiting filter capacitors of the output filter 4.

Figure 3:
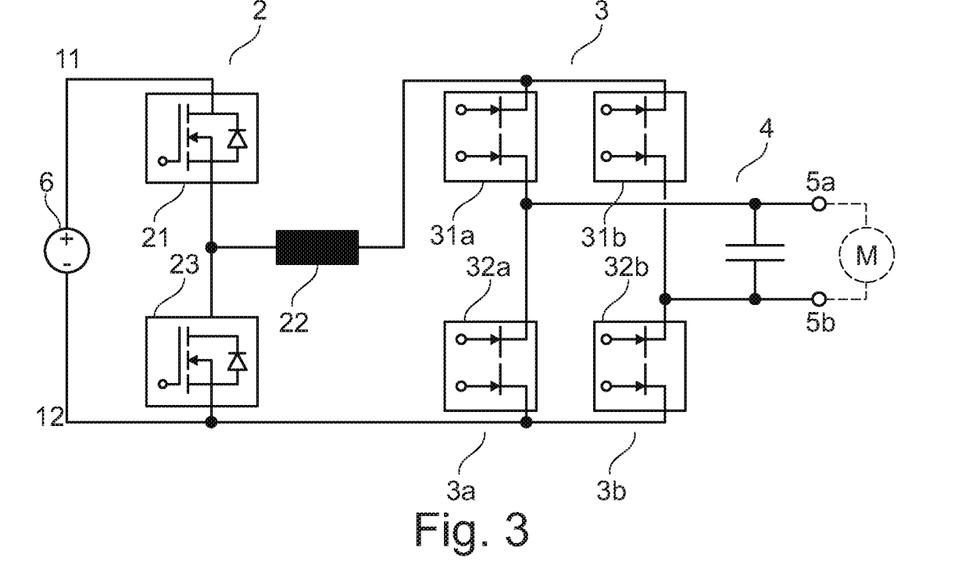
FIG. 3 illustrates one example of a power converter that includes an H4 motor configuration.

FIG. 3 shows a modification of the power converter shown in FIG. 1. In the power converter shown in FIG. 3 the inverter 3 includes an H4 configuration with two half bridges 2a, 2b. This inverter 3 is configured to drive a single-phase motor. Output currents $i_a$, $i_b$ of this inverter have a phase shift of 180°. According to one example, a first one 2a of the two half bridges 2a, 2b includes normally-on switches, while the other one 2b of the two half bridges 2a, 2b includes normally-off switches.

Figure 4:
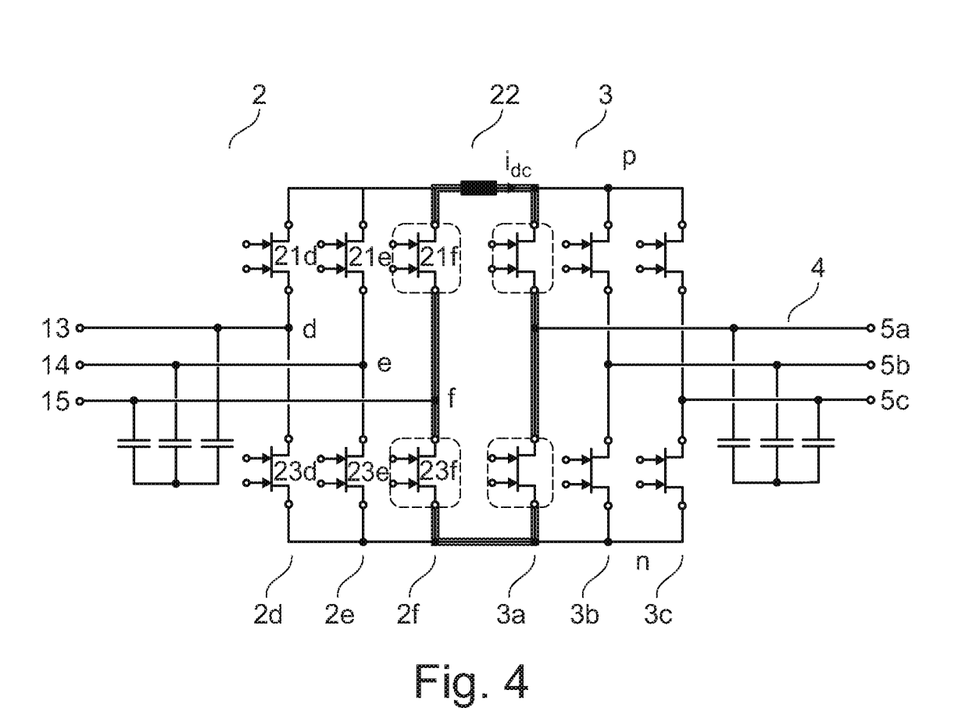
FIG. 4 illustrates one example of an arrangement that includes a three phase current source inverter being fed from a 3-phase current DC-link back-to-back converter.

FIG. 4 illustrates another modification of the power converter shown in FIG. 1. In the power converter shown in FIG. 4, the current source 2 is configured to receive a 3-phase sinusoidal input voltage at an input 13, 14, 15 instead of a DC voltage as illustrated in FIG. 1, The current source 2 includes three half bridges 2d, 2e, 2f, wherein each of these half bridges 2d, 2e, 2f includes a respective tap d, e, f connected to a respective one of the input nodes 13, 14, 15, wherein each of these input nodes 13, 14, 15 is coupled to one phase of a 3-phase voltage source (not shown in FIG. 4). A high-side switch 21d, 21e, 21f of each half-bridge 2d, 2e, 2f is connected between the inductor 22 and a respective one of the taps d, e, f, and a low-side switch 23d, 23e, 23f is connected between the respective tap d, e, f and the second intermediate node n. The half bridges 2d, 2e, 2f of the current source 2 are driven by the controller 7 (not shown in FIG. 4) dependent on the motor control signal such that the source current $i_{dc}$ provided by the current source 2 is in accordance with the motor control signal. More specifically, the controller 7 is configured to generate drive signals received by the electronic switches of the half-bridges 2d, 2e, 2f. These drive signals are PWM signals, wherein the controller 7 is configured to control a duty cycle of these PWM signals such that the source current $i_{dc}$ is in accordance with the motor control signal.

According to one example, the switches of at least one of the half-bridges 2d, 2e, 2f of the current source 3 are implemented as normally-on switches. According to one example, the switches of one of the half-bridges 2d, 2e, 2f of the current source 2 are normally-on switches and the switches of the other two of the half-bridges 2d, 2e, 2f are normally-off switches. in each case, the one of the half-bridges 2d, 2e, 2f of the current source 2 that includes the normally-on switches and the one of the half-bridges 3a, 3b, 3c of the inverter 3 that includes the normally-on switches provide a freewheeling path for the source current idc when a failure occurs.

The configuration shown in FIG. 4 would always create free-wheeling paths no matter whether the converter operates in power delivery mode (power fed from the AC source to the machine M) or in power recuperation mode (power being fed from the machine back to the AC grid). In other words, no matter in which direction the current flows in the inductor 22, there is always a free-wheeling path.

Figure 5:
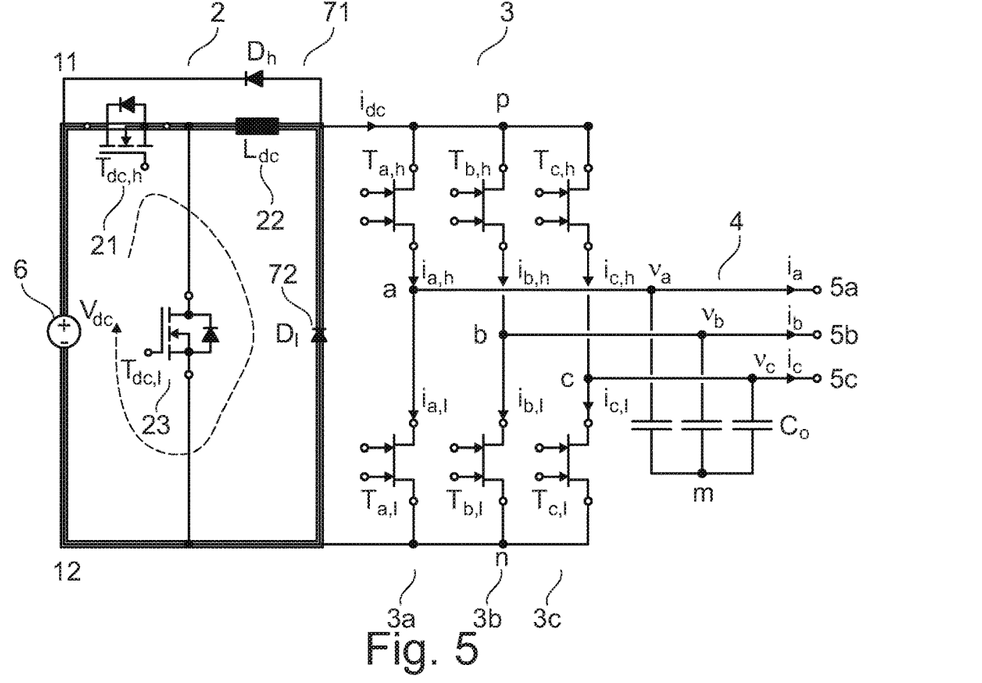
FIG. 5 illustrates a power converter according to another example, wherein the power converter includes a clamping network with diodes and, in this example, operates in a power recuperation mode.
Figure 6:
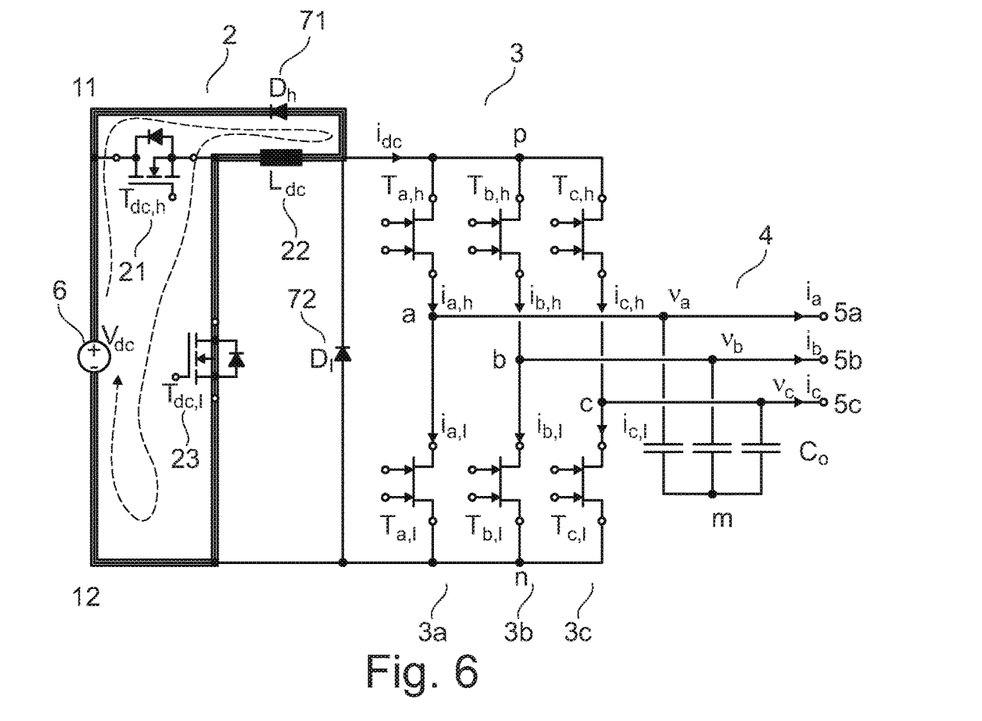
FIG. 6 illustrates the power converter shown in FIG. 5 when the clamping network with diodes is in a power delivery mode.

FIGS. 5 and 6 illustrate another example of the power converter. In this example, the high-side switches and the low-side switches 31, 32 of each half-bridge 3a, 3b, 3c may be implemented as normally-off switches. However, it is also possible to implement these switches 31, 32 as normally-on switches. In the current source 2 according to FIGS. 5 and 6 a freewheeling path for the current $i_{dc}$ provided by the current source 3 is provided by a diode clamping network that includes a first diode 71 connected in parallel with the series circuit including the switch 21 and the inductor 22 and a second diode connected in parallel with the half-bridges 3a, 3b, 3c.

Figure 7:
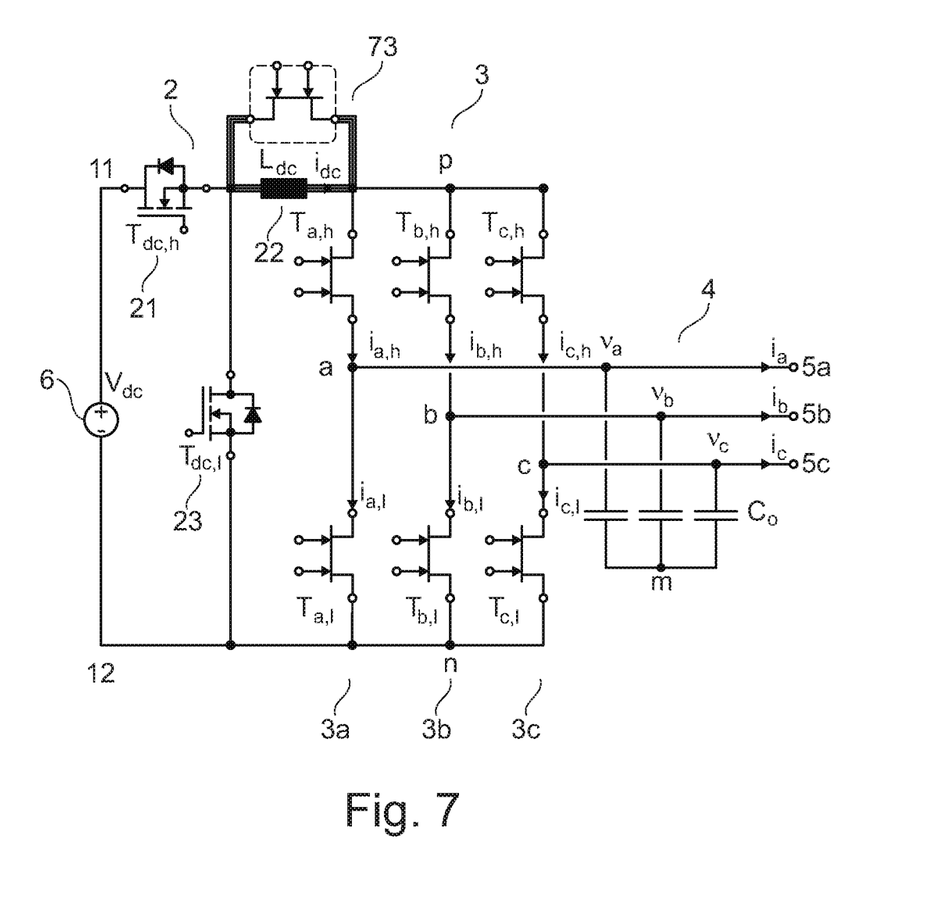
FIG. 7 illustrates a power converter according to yet another example, wherein the power converter includes a bypass using one normally-on bidirectional switch.

According to another example illustrated in FIG. 7, a freewheeling element 73 is connected only in parallel with the inductor 22. According to one example, the freewheeling element 73 is a normally-on switch. According to one example, the normally-on switch is a bidirectionally blocking GaN HEMT.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A current source inverter, comprising:
   a combination of normally-on and normally-off switches configured to provide free-wheeling paths for current in case of loss of control signals or gate drive power;
   a current source;
   an inverter connected to the current source and comprising the combination of normally-on and normally-off switches; and
   a controller for both the current source and the inverter,
   wherein the controller is configured to regulate a source current generated by the current source and received by the inverter based on a motor control signal, such that the source current equals a desired maximum output current at a respective output of the inverter,
   wherein the current source comprises an inductor connected between an input node and an intermediate node of the current source inverter, and a freewheeling element,
   wherein the freewheeling element in the current source and the normally-on switches in the inverter form a freewheeling current path that allows current through the inductor to continue to flow when a failure occurs,
   wherein the current source further comprises an electronic switch connected between the input node of the current source inverter and the inductor in the current source,
   wherein the freewheeling element in the current source is connected between another intermediate node of the current source inverter and a node located between the electronic switch and the inductor,
   wherein the inverter is connected between the intermediate nodes of the current source inverter,
   wherein the controller is configured to repeatedly switch on the electronic switch in the current source to connect the inductor in the current source to a voltage source, and
   wherein in time periods in which the electronic switch is switched off, the freewheeling element takes over the source current through the inductor.

2. The current source inverter of claim 1,
   wherein the inverter comprises at least two half bridges each comprising a high-side switch and a low-side switch, and wherein each high-side switch and each low-side switch of at least one of the at least two half bridges is a normally-on switch.

3. The current source inverter of claim 2, wherein each normally-on switch is a normally-on GaN HEMT.

4. The current source inverter of claim 2,
wherein each high-side switch and each low-side switch of exactly one of the at least two half bridges is a normally-on switch, and
wherein each high-side switch and each low-side switch of a remainder of the at least two half bridges is a normally-off switch.

5. The current source inverter of claim 4,
wherein each normally-off switch is a normally-off GaN HEMT.

6. The current source inverter of claim 2,
wherein each normally-on switch and each normally-off switch is a bidirectionally blocking switch.

7. The current source inverter of claim 2, further comprising a capacitive output filter.

8. The current source inverter of claim 1,
wherein the current source further comprises a diode clamping network.

9. The current source inverter of claim 8, wherein the diode clamping network comprises:
a first diode connected in parallel with a series circuit including the inductor and the electronic switch, and
a second diode connected in parallel with the inverter.

10. The current source inverter of claim 1,
wherein the current source further comprises a normally-on bidirectional switch connected in parallel with the inductor.

11. The current source inverter of claim 1,
wherein the inverter comprises at least two half bridges each comprising a high-side switch and a low-side switch,
wherein the at least two half bridges are configured to output respective currents that are phase shifted relative to one another over a 360° period, the 360° period being subdivided into a plurality of equal sectors,
wherein in each of the plurality of equal sectors, the controller is configured to operate the high-side switch or the low-side switch in two of the at least two half-bridges in a pulse width modulation (PWM) fashion while the other one of the high-side switch or the low-side switch in the two half-bridges is switched off.

12. The current source inverter of claim 1, wherein the freewheeling element in the current source is an n-type enhancement MOSFET.

13. A method, comprising:
generating at least one output current by a current source inverter, wherein the current source inverter comprises a current source, an inverter connected to the current source, and a controller for both the current source and the inverter, wherein the inverter comprises at least two half bridges each comprising a high-side switch and a low-side switch, wherein each of the high-side switch and the low-side switch of at least one of the at least two half bridges is a normally-on switch, wherein the current source comprises an inductor connected between an input node and an intermediate node of the current source inverter, and a freewheeling element, wherein the current source further comprises an electronic switch connected between the input node of the current source inverter and the inductor in the current source, wherein the freewheeling element in the current source is connected between another intermediate node of the current source inverter and a node located between the electronic switch and the inductor, wherein the inverter is connected between the intermediate nodes of the current source inverter;
controlling the current source based on a motor control signal received by the controller;
generating, by the current source, a source current received by the inverter dependent on the motor control signal in such a way that the source current equals a desired maximum output current at a respective output of the inverter;
repeatedly switching on the electronic switch in the current source to connect the inductor in the current source to a voltage source; and
when a failure occurs, forming a freewheeling current path that includes the freewheeling element in the current source and the normally-on switches in the inverter, wherein the freewheeling current path allows current through the inductor to continue to flow,
wherein in time periods in which the electronic switch is switched off, the freewheeling element takes over the source current through the inductor.

14. The method of claim 13, further comprising:
outputting, by the at least two half bridges, respective currents that are phase shifted relative to one another over a 360° period, the 360° period being subdivided into a plurality of equal sectors; and
in each of the plurality of equal sectors, operating the high-side switch or the low-side switch in two of the at least two half-bridges in a pulse width modulation (PWM) fashion while the other one of the high-side switch or the low-side switch in the two half-bridges is switched off.

* * * * *

UNITED STATES PATENT AND TRADEMARK OFFICE
CERTIFICATE OF CORRECTION

PATENT NO. : 11,728,746 B2
APPLICATION NO. : 16/848104
DATED : August 15, 2023
INVENTOR(S) : G. Deboy et al.

Page 1 of 1

It is certified that error appears in the above-identified patent and that said Letters Patent is hereby corrected as shown below:

On the Title Page

Item (30) please insert -- 102019109927.7 DE 2019-04-15 --

Signed and Sealed this
Twentieth Day of February, 2024

Katherine Kelly Vidal
*Director of the United States Patent and Trademark Office*